United States Patent [19]

Segner et al.

[11] Patent Number: 5,973,448

[45] Date of Patent: Oct. 26, 1999

[54] DISPLAY SCREEN FOR A CATHODE RAY TUBE OF GLASS HAVING AN ADJUSTABLE SPECTRAL TRANSMISSION CURVE AND A METHOD FOR PRODUCING THE SAME

[75] Inventors: Johannes Segner, Stromberg; Martin Heming, Saulheim; Manfred Freundel, Mainz, all of Germany

[73] Assignee: Schott Glas, Mainz, Germany

[21] Appl. No.: 08/589,716

[22] Filed: Jan. 22, 1996

[30] Foreign Application Priority Data

Jan. 20, 1995 [DE] Germany ............... 195 01 640

[51] Int. Cl.⁶ ............... H01J 29/10; H01J 31/00
[52] U.S. Cl. ............... 313/461; 313/466; 313/477 R; 313/479; 313/480
[58] Field of Search ............... 313/461, 468, 313/473–474, 477 R, 478–480, 110, 112, 113; 501/64–67, 69, 72; 106/52–53; 252/478, 500, 502, 510, 315.01; 358/250, 252–253; 427/64, 68, 162, 105, 419.3, 106, 108, 126.2–126.4, 160, 240; 428/325, 216, 428, 426, 437; 359/885, 889, 64, 68, 614, 586–590; 348/834, 820

[56] References Cited

U.S. PATENT DOCUMENTS

| 3,987,330 | 10/1976 | Shell ............... 313/480 |
| 4,694,218 | 9/1987 | Chao ............... 313/478 |
| 4,769,347 | 9/1988 | Cook et al. ............... 313/480 X |
| 5,412,278 | 5/1995 | Iwasaki ............... 313/478 |
| 5,520,855 | 5/1996 | Ito et al. ............... 313/479 X |
| 5,539,275 | 7/1996 | Arimoto et al. ............... 313/461 |
| 5,627,429 | 5/1997 | Iwasaki ............... 313/474 |
| 5,652,476 | 7/1997 | Matsuda et al. ............... 313/478 |
| 5,652,477 | 7/1997 | Tong et al. ............... 313/479 |
| 5,717,282 | 2/1998 | Oomen et al. ............... 313/479 |
| 5,742,119 | 4/1998 | Abrem et al. ............... 313/479 |
| 5,760,540 | 6/1998 | Duistermaat ............... 313/477 R |

FOREIGN PATENT DOCUMENTS

| 2664260 | 5/1990 | France . |
| 2664259 | 7/1990 | France . |
| 2363319 | 7/1974 | Germany . |
| 3629996 | 3/1988 | Germany . |
| 3941795 | 6/1991 | Germany . |
| 4117257 | 12/1992 | Germany . |
| 1304169 | 1/1973 | United Kingdom . |

OTHER PUBLICATIONS

"Multifunktionale Schicht–und Bulkwerkstoffe nach Mass" in Ingenieur Werkstoffe, vol. 3, (1991) Nr. 12, pp. 20–22.

*Primary Examiner*—Nimeshkumar D. Patel
*Assistant Examiner*—Mack Haynes
*Attorney, Agent, or Firm*—Walter Ottesen

[57] ABSTRACT

A display screen for a cathode ray tube has an adjustable transmission curve in the visible spectral range of ($\lambda$) between 380 to 780 nm. The display screen includes: a glass containing an oxide compound and being recyclable by melting under oxidizing conditions and without changing its characteristics and its color; the display screen having a transmission between 70% and 90% and at least one coating applied to the glass; the coating including the oxide compound; and/or, the coating including a component which forms an oxide compound in a melt of coated display screens which oxide component is likewise contained in the glass; and/or, the coating further including $TiO_2$; and/or, the coating further including titanium or compounds of titanium from which $TiO_2$ is formed when the display screen is melted; and/or, the coating forming volatile compounds in the melt which escape from the melt in gaseous form when compounds forming in the melt contain components other than titanium oxide or the glass of the display screen.

11 Claims, No Drawings

DISPLAY SCREEN FOR A CATHODE RAY TUBE OF GLASS HAVING AN ADJUSTABLE SPECTRAL TRANSMISSION CURVE AND A METHOD FOR PRODUCING THE SAME

FIELD OF THE INVENTION

The invention relates to display screens for cathode ray tubes having an adjustable spectral transmission curve in the visible spectral range. The display screen is made of recyclable glass which can be melted under oxidizing conditions without changing its characteristics and its color. The display screen has a high stability with respect to radiation, especially with respect to UV-radiation, X-ray radiation and electron radiation, which occurs in cathode ray tubes. The display screen further has a transmission in the order of magnitude between 70% and 92% and at least one layer applied to the glass. With this layer, the particular lower spectral transmission curve between 30% and 70% is adjusted. The invention also relates to a method for producing such layers.

BACKGROUND OF THE INVENTION

For many years, the demand has been made to participate actively in avoiding refuse, more particularly to recycle useful materials contained therein. The continuously appearing press reports with respect to the subject of recycling have characterized this demand. However, and when examined closely, the press reports cannot hide the fact that, in many cases, there are no solutions for a recycling of materials. The main problem is a strict separation of materials in the case of plastics as well as in the case of metals or glass.

The German electronic scrap ordinance emphasizes recycling in the context of a dual system. Consensus has been achieved with respect to many groups of materials, however, that, for the most part, only down-recycling is possible, more particularly, use in alternate products.

In this context, it can be assumed that manufacturers of intermediate products for electrical components such as television tubes will be addressed with respect to recycling.

The glass of a television tube is of special concern because of its weight during recycling of television apparatus.

The reasons for the difficulties of recycling television glass will now be explained. Often, comparisons are presented to recycling in the glass vessel industry. The example is suitable to clarify the different conditions which are present for possible modes of recycling. The glass vessel industry in Europe has, for a long time, at least with reference to the different countries, a substantially unified glass composition as a consequence of making processing similar and having the same suppliers of raw materials. Differences with respect to the chemical composition of glasses from neighboring countries however make recycling of imported products difficult. The recycling quota in Germany lies on average at approximately 53%. An increase is only possible by a still stricter separation of colored glasses.

The differences of only a few percent in the chemical composition between imported and domestic products with respect to glass for making vessels make recycling difficult; however, these differences are much greater for television glass because the European manufacturers of tubes and apparatus are supplied with glass from all over the world. Also, and for various technical reasons, the differences in the chemical composition of television glasses are increased.

The differences in the transmission and color of the screen glass make matters even more difficult. Apparatus have been and are being offered having screens of different transmissions. If, in the manufacture of television tube glass, greater quantities of fragments with different transmissions are used, then the color of the glass in the melt trough can no longer be controlled. A sorting of television glass is however almost impossible. In no case can one assume glass to be strictly separated by type after a separation of the display screen and funnel because a multiplicity of different glass compositions is still present behind the screen glass and funnel glass obtained. The separation nonetheless makes sense because basically, lead containing glass and glass which is substantially free of lead is separated. With reference to the composition of the funnel glass, only slight differences have been determined from one manufacturer to the other. This affords the possibility to return glass in the direct loop with reduced risk. However, the spread of the composition only allows a very limited fragment admixture so that critical characteristics of the glass can be controlled within tolerances. The critical characteristics are, for example: X-ray absorption, color, transmission, sight errors, electrical breakdown strength and thermal expansion.

These characteristics are already influenced by changing the glass composition by a few tenth of a percent. A change of the thermal coefficient leads to stresses in the screen-funnel bond and endangers, for example, the implosion stability.

The requirements as to the constancy of the characteristics can only be satisfied when the glass is melted with clearly defined raw materials. With respect to its sequence and its control possibilities, the melting process is not comparable to the processing operation. Processing is characterized by rapid control of the dimensional stability and corresponding feedback when errors occur. The melting process is a lethargic process having a very long reaction time of approximately 40 hours starting from the weigh-in of the raw materials to the finished product. A control operation is therefore not possible. If a raw material is used, such as the recycled glass having a high spread and fluctuation in the composition, then the controllability of the process is reduced and therefore, inter alia, the reliability which the product must have.

The sorting possibilities of television tube refuse do not today correspond to the requirements necessary for a trouble-free melting process. The recycling use is therefore today only possible for a small portion of present day production.

Display screen glasses contain as essential constituents the following: $SiO_2$, $Al_2O_3$, $BaO$, $Na_2O$, $K_2O$ and additional absorbing admixtures. In this way, the contrast of the television image is increased.

Depending upon the manufacturer of the apparatus and apparatus type, the display screen glass can exhibit a different spectral transmission so that a great many display screen glasses having different spectral transmissions are to be melted and stored.

The manufacture of display screen glasses having different spectral transmission takes place in that the glass, depending upon requirement, is either melted discontinuously from different raw material compositions sequentially in a crucible or in several crucibles simultaneously and continuously.

Fragments are added to the melt in order to melt the particular glass mixture easier and at lower energy cost and in order to also be able to economically reuse the fragments. The manufacture of a display screen glass with a spectral transmission which cannot be precisely defined is to be absolutely avoided. Only such fragments can be added which exhibit the same spectral transmission as the glass to be melted.

For this reason, fragments must be sorted according to spectral transmission and stored before adding to the glass melt. This is very costly.

A still more complex storage can be expected when a statutory requirement is imposed which requires the manufacturer to take back used apparatus and apparatus for which no service life remains. The manufacturers of cathode ray tubes will receive very different types of display screen glasses which, if they are to be used again for display screens, must be separately collected and separately stored at great expense.

Accordingly, satisfying the demand for new cathode ray tubes having different spectral transmission, on the one hand, and, on the other hand, to collect the used cathode ray tubes comprising different glasses and to separate therefrom that glass which can be reused, is associated with great complexity and high cost.

SUMMARY OF THE INVENTION

In view of the foregoing, it is an object of the invention to provide a simple and cost effective method for manufacturing display screens for cathode ray tubes having different spectral transmission. It is a further object of the invention to provide such a method wherein the number of melts for the display screen glasses is greatly reduced and which, furthermore, significantly simplifies and makes less costly the logistics in storage of the glass fragments from refuse and in the recyclability of used cathode ray tubes.

It is a further object of the invention that the glass of the display screen (which is adjusted to a specific desired transmission curve) can be melted during recycling processes without affecting the method and that no additional coloring of the glass results which can be measured in the visible spectral range. This additional coloring should not exceed the transmission of the original glass so that these glasses can be used again as display screens.

The essence of the invention is that the display screen is made of a glass which is virtually absorption free or only comparatively weakly absorbent. Also, the transmission which is required and desired by the manufacturer for the particular display screen type, can be adjusted by an additional solarization stable coating which contains only those constituents which in no way disturb the melt process when introduced into a display screen glass melt and effect no additional coloration of the display screen in the visible range. The display screen is produced from one such melt.

Compounds which constitute a disturbance in the display screen glass by changing the transmission are oxidized under the given melt conditions and/or are removed in that they escape in the form of a gas from the melt.

Examples of disturbing constituents are, for example, CO-oxide, Mn-oxide and Fe-oxide which change the glass with respect to its transmission by ion coloration.

Solarization stability means here the stability especially with respect to such UV rays and X-rays which are to be expected for a cathode ray tube.

The display screen comprises a glass having the composition (in percent by weight) of $SiO_2$ (60 to 63); BaO (8.3 to 13.0); $Na_2O$ (6.6 to 9.4); $K_2O$ (6.6 to 8.4); SrO (2.2 to 8.8); $Al_2O_3$ (2.0 to 3.4); CaO (0.1 to 3.2); $ZrO_2$ (0 to 2.3); and MgO (0 to 1.2). The invention provides that the display screen which is made of glass having this composition can be produced with the lowest basic absorption required by the marketplace or the highest spectral transmission required by the marketplace. The invention also provides that the requirement for display screens having a lower spectral transmission is satisfied by an additional suitable coating. A weak basic absorption of the display screen glass is given when the display screen has a transmission in an order of magnitude between 70% and 92%.

According to the invention, only coatings are applied to the glass made of compounds and in such compositions that no detectable coloration of the glass occurs in the visible wavelength range after melting the glass together with the coating and especially for recycling processes. Only in this way is it essentially possible in the future to reuse fragments of used display screens which are unsorted as an additive for a new melt of display screen glass in a cost effective manner.

In a preferred embodiment of the invention, the coating is a metal coating and especially a coating made of the components aluminum and/or titanium and/or silicon. The coating is applied to the glass and changes the spectral transmission curve of the display screen.

In experiments, it has been shown to be advantageous when the coating, which changes the spectral transmission curve and which is applied to the glass, comprises a dielectric transparent matrix, especially of $SiO_2$ or $Al_2O_3$ in which metal components are embedded. These metal components are especially the components titanium and/or aluminum.

In a further preferred embodiment of the invention, the coating, which is applied to the glass, is produced from a Ti-compound by firing utilizing a laser. The coating changes the spectral transmission curve.

A liquid film of an organic Ti compound is applied to the surface to be coated and is converted into a fixed C-containing $TiO_2$ layer by the radiation of a $CO_2$ laser.

As a consequence of the high and specific laser energy, high coating rates are possible at low substrate temperatures.

Chelate compounds of titanium such as $Ti(O(CH_2)_3CH_3)_4$ have been shown to be especially suitable for achieving a high absorption.

The coating, which changes the spectral transmission curve, includes at least $10^{-8}$ Mol metal per $cm^2$ of coated glass surface. The $10^{-8}$ Mol of metal is especially titanium and/or aluminum and/or silicon.

Excellent results were obtained when the coating, which changes the spectral transmission curve, comprises amorphous carbon (a-C:H). The component titanium can be embedded in this coating.

According to the invention, it is also possible that the coating, which is applied to the glass and which changes the spectral transmission curve, comprises metal oxides, especially of $TiO_2$ or $SiO_2$ or $Al_2O_3$ in which the component carbon is embedded.

The carbon content of the oxide layer amounts to at least 5% and the absorption increases with the carbon content.

Oxide layers, which are part of reflection-reducing coatings according to the state of the art, are however not suitable for the application intended.

Furthermore, the coating, which changes the spectral transmission curve, can comprise carbides and especially carbides of titanium and/or of silicon or of a so-called ORMOCER in which the color-imparting substances are embedded. These substances are especially azo coloring, nitro coloring, triphenyl coloring, methane coloring or carbonyl coloring. ORMOCERs are described in detail, for example, in the publication "Ingenieur Werkstoffe", volume 3, (1991), no. 12, pages 20 to 22.

According to the invention, it is advantageous to apply the coating to the outer side of the display screen facing toward the viewer. However, it is also possible to apply the coating on the inner surface of the display screen.

For purely metal coatings, the coating of the invention is applied to the display screens of glass so that it has a layer thickness of approximately 1 nm to 15 nm, especially from 2 nm to 8 nm. For matrix layers, the coating according to the invention is applied to the display screen of glass so that it has a layer thickness of approximately 10 nm to 5,000 nm, especially from 20 nm to 500 nm.

Depending upon the type of coating, the layer thickness must however be determined in simple preliminary experiments in each case for a specific transmittance.

In some cases, it has been shown to be advantageous when a further dielectric transparent coating is applied to the coating which changes the spectral transmission curve. This additional dielectric transparent coating is a protective layer for the coated glass and is especially of $SiO_2$, $CaF_2$, $Al_2O_3$ or can be an ORMOCER layer without additional color-imparting substances.

The coatings of the invention are applied to the glasses in accordance with processes known per se.

It has been shown advantageous when the coating is formed pursuant to a PVD process and especially by cathode atomization, ion supported vaporization or high-vacuum vaporization onto the glass or, in the alternative, when the coating is formed on the glass by a pyrolysis process and especially when applied by one of the following: spray process, hot-spray process, centrifugal process or dip process.

Pyrolysis processes are described, for example, in German patent publication 2,363,319 and in French patent publications 2,664,259 and 2,664,260. Here, pyrolysis methods for producing gray layers of metal-organic solutions are disclosed which contain Al and Ti or Al and Sn. Furthermore, the layer formed is made adequately electrically conductive and therefore antistatic by utilizing the Sn component.

Further possibilities comprise forming the coating by means of a CVD process and especially by means of a PCVD process on the glass or by coating in a sol-gel process, especially by means of IR-drying and/or by firing with a laser.

When recycling the display screen coated in this manner by melting under oxidizing melt conditions, the compounds from which these layers are formed and which would constitute a disturbance in the glass of the display screen by changing the transmission are oxidized and removed.

The following examples are presented for further explaining the invention.

EXAMPLE 1

A solution in the form of a liquid film is applied to the outer surface of a television display screen having the glass composition (in percent by weight) $Na_2O$ 8.4; $K_2O$ 7.6; MgO 0.6; CaO 1.2; SrO 5.6; BaO 10.8; $Al_2O_3$ 2.8; ZrO 1.0 and $SiO_2$ 62. The solution contains titanium oxides as titanium compounds and chelate-forming compounds. Thereafter, radiation of high intensity is generated by means of a $CO_2$ laser and this radiation applies the necessary energy to the substrate for the reaction of the liquid film and thereby applies a $TiO_2$ layer of approximately 90 nm thickness which appears neutral gray when viewing therethrough at a transmission of approximately 60%. The $TiO_2$ coating solution, which is modified by the chelates, is, for example, produced from the following: 137.0 ml $Ti(O(CH_2)_3CH_3)_4$; 832.0 ml ethanol; 10.1 ml acetylacetone; and 17.4 ml ethyl-butyrylacetate.

This solution is applied in a room which is maintained at a temperature of 26° C. and has a humidity of 7 to 12 g/m$^3$, preferably of 8 g/m$^3$. The solution is applied to a glass substrate in that the well cleaned glass substrate is dipped into the solution and withdrawn therefrom at a velocity in the range of 0.3 to 0.5 cm/s. Immediately thereafter, the substrate is fired utilizing a $CO_2$ laser.

The production parameters are:

laser power (P/W): 16.7 scan velocity (v/cm-s$^{-1}$): 76.8.

Melt experiments under oxidizing conditions show that the $TiO_2$ layer in no way affects the melt behavior and the relevant parameters. This is especially true with respect to the transmission of the glass melted thereby with respect to its later use.

EXAMPLE 2

The television display screen (diagonal outer dimension 70.2 cm) is arranged in a high-vacuum coating unit at a spacing of approximately 50 cm to the vaporization source which is a crucible of an electron beam vaporizer filled with Al. The unit is first evacuated to a pressure of 0.0001 mbar and oxygen is allowed to flow in until a pressure of approximately 0.001 mbar is obtained. Thereafter, an oxygen glow discharge with a voltage of 2.5 kV is ignited and maintained for 30 seconds in order to condition the surface to be coated.

Thereafter, the unit is evacuated to a pressure of <0.0001 mbar and the vaporizer is switched on. After adjusting the coating rate beneath a diaphragm, the diaphragm is opened and an approximately 5 nm thick aluminum layer is permitted to condense on the television display screen. The diaphragm is then closed. This layer has a wavelength-independent light transmittance of 50%±3%.

Thereafter, a low absorption hard layer is applied by vaporization by means of a further vaporizer in order to make the aluminum layer stable against environmental influences. The low absorption hard layer can, for example, be a 200 nm thick $CaF_2$ layer or a 1,000 nm thick $SiO_2$ or $Al_2O_3$ layer.

Melt experiments under oxidizing conditions show that the applied layers do not affect the melt behavior of the coated glass substrate and relevant parameters of the melted glass.

EXAMPLE 3

The television display screen (diagonal outer dimension 70.2 cm) is arranged with its inner surface in a high-vacuum coating unit at a spacing of approximately 50 cm to the vaporization source which is a tungsten crucible filled with Ti. The unit is first evacuated to a pressure of 0.0001 mbar and oxygen is allowed to flow in until a pressure of approximately 0.001 mbar is obtained. An oxygen glow discharge with a voltage of 2.5 kV is ignited and maintained for 30 s in order to condition the surface to be coated.

Thereafter, the unit is evacuated to a pressure of <0.0001 mbar and the tungsten crucible is heated. After adjusting the coating rate under a diaphragm, the diaphragm is opened and an approximately 7 nm thick Ti layer is permitted to condense on the television display screen and the diaphragm is then closed.

This layer has a substantially wavelength-independent light transmittance of 40%±2%.

Thereafter, a low absorption layer is applied by vaporization by means of a second vaporization crucible in order to make the Ti layer stable against environmental influences until the television tube is completed. The layer can, for example, be a 10 nm thick $CaF_2$ layer.

Melt experiments under oxidizing conditions show that the applied layer does not affect the melt behavior of the coated glass substrate and relevant parameters of the melted glass.

EXAMPLE 4

The following is an example for coating of glass with a neutral-gray hot-spray layer.

The following solutions (1) and (2) are mixed with each other to provide a coating solution:

Solution (1): 50 g $SnCl_4$ are dissolved in 70 g methanol;
Solution (2): 1.2 g $SbCl_4$ and 0.5 g titanacetylacetonate are dissolved in 50 g ethanol.

The glass is heated for 5 minutes in an oven at a temperature of 480° to 520° C. Directly thereafter, the glass is sprayed with the coating solution. The result is a substantially neutral-gray layer over the visible range of the spectrum.

The layer produced in this manner does not affect the melt behavior and the layer also does not cause any additional measurable coloration of the glass in the visible spectral range which would go beyond the transmission of the uncoated glass.

The invention shows a possibility of manufacturing display screens from glass compositions having a transmission between 70% and 90%. The display screens achieve a spectral transmission curve between 30% and 70% to increase the display screen contrast with a coating thereon. This spectral transmission curve can be adjusted and is pregiven by the type of apparatus and by the manufacturers. The display screens can be melted without difficulty after use and can again be processed to form display screens and attachment plates without an additional coloration occurring and/or affecting the use characteristics. In this way, very significant advantages during production and during recycling are provided.

It is understood that the foregoing description is that of the preferred embodiments of the invention and that various changes and modifications may be made thereto without departing from the spirit and scope of the invention as defined in the appended claims.

What is claimed is:

1. A recyclable display screen for a cathode ray tube having an adjustable transmission curve in the visible spectral range of (λ) between 380 to 780 nm, the recyclable display screen comprising:

a glass essentially consisting of the composition (in percent by weight on oxide basis) $SiO_2$ 60 to 63; BaO 8.3 to 13.0; $Na_2O$ 6.6 to 9.4; $K_2O$ 6.6 to 8.4; SrO 2.2 to 8.8; $Al_2O_3$ 2.0 to 3.4; CaO 0.1 to 3.2; $ZrO_2$ 0 to 2.3; and MgO 0 to 1.2;

said display screen having a transmission between 70% and 92%;

at least one coating applied to said glass for adjusting said spectral transmission curve to a lower range of between 30% to 92%;

said glass of said recyclable display screen, when recycled by melting under oxidizing conditions, has characteristics and a color and therefore a transmission curve, which remains unchanged compared to the original glass of said display screen; and, said coating being formed of one of the following substances: metal, amorphous carbon (a-C:H), amorphous carbon with titanium embedded therein, an oxide matrix with metallic components embedded therein, an oxide matrix with carbon embedded therein, $TiO_2$, carbides and ORMOCER having color-imparting substances embedded therein.

2. The recyclable display screen of claim 1, said metal coating being formed of one of the following: aluminum, titanium and silicon.

3. The recyclable display screen of claim 1, said oxide matrix being one of the following: $SiO_2$ with titanium embedded therein, $SiO_2$ with aluminum embedded therein, $Al_2O_3$ with titanium embedded therein and $Al_2O_3$ with aluminum embedded therein.

4. The recyclable display screen of claim 1, wherein said coating contains one of at least $10^{-5}$ Mol titanium, aluminum and silicon per square centimeter of coated glass.

5. The recyclable display screen of claim 1, said coating being formed of one of the following: $Tio_2$ in which carbon is embedded, $SiO_2$ in which carbon is embedded and $Al_2O_3$ in which carbon is embedded.

6. The recyclable display screen of claim 1, said coating being formed of one of the following: a carbide of titanium and a carbide of silicon.

7. The recyclable display screen of claim 1, said coating being formed of ORMOCER in which one of the following is embedded: azo-colorant, nitro-colorant, triphenyl-colorant, methane-colorant and carbonyl-colorant.

8. The recyclable display screen of claim 1, said coating being a first coating and said display screen further comprising a dielectric transparent coating superposed on said first coating as a protective layer for the coated glass.

9. The recyclable display screen of claim 8, wherein said dielectric transparent coating is made of a noncolor-imparting substance and said noncolor-imparting substance being one of the following: $SiO_2$, $CaF_2$, $Al_2O_3$ and ORMOCER.

10. The recyclable display screen of claim 1, wherein said recyclable display screen has an inner surface and said coating is applied to said inner surface.

11. A recyclable display screen for a cathode ray tube having an adjustable transmission curve in the visible spectral range of (λ) between 380 to 780 nm, the recyclable display screen comprising:

a glass essentially consisting of the composition (in percent by weight on oxide basis) $SiO_2$ 60 to 63; BaO 8.3 to 13.0; $Na_2O$ 6.6 to 9.4; $K_2O$ 6.6 to 8.4; SrO 2.2 to 8.8; $Al_2O_3$ 2.0 to 3.4; CaO 0.1 to 3.2; $ZrO_2$ 0 to 2.3; and MgO 0 to 1.2;

said display screen having a transmission between 70% and 92%;

at least one coating applied to said glass for adjusting said spectral transmission curve to a lower range of between 30% to 92%;

said glass of said recyclable display screen, when recycled by melting under oxidizing conditions, has character istics and a color and therefore a transmission curve, which remains unchanged compared to the original glass of said display screen; and, said coating being of a substance selected from the group consisting essentially of metal, amorphous carbon (a-C:H), amorphous carbon with titanium embedded therein, an oxide matrix with metallic components embedded therein, an oxide matrix with carbon embedded therein, $TiO_2$, carbides and ORMOCER having color-imparting substances embedded therein.

* * * * *